Patented July 25, 1950

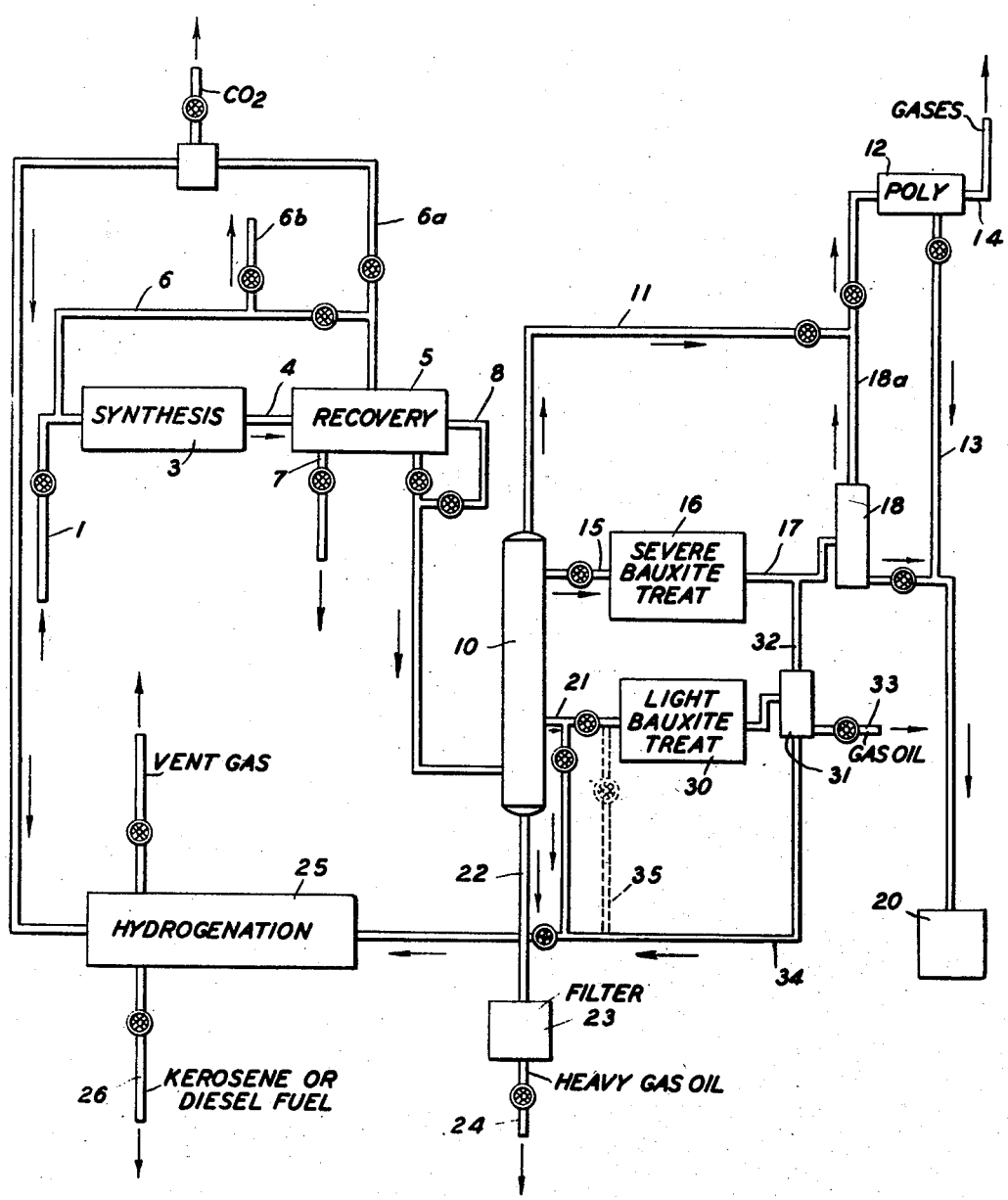

2,516,699

UNITED STATES PATENT OFFICE 2,516,699

PROCESSING OF HYDROCARBON SYNTHESIS PRODUCTS

Charles E. Hemminger, Westfield, N. J., assignor to Standard Oil Development Company, a corporation of Delaware Application January 15, 1947, Serial No. 722,275

1 Claim. (Cl. 260—450)

My invention relates to improvements in the manufacture of hydrocarbons and oxygenated hydrocarbons employing as starting materials carbon monoxide and hydrogen and, in particular, it relates to a method for removing the oxygen from oxygenated products formed so as to yield products of improved odor, good stability against gum formation on storage, and to increase the octane number.

It is known that hydrocarbons and oxygenated hydrocarbons may be formed from a feed gas containing hydrogen and carbon monoxide. The process is catalytic and the catalyst is usually a metal of the VIII group of the periodic system, such as cobalt or iron. Recently, in this country considerable research has been and is now being carried out directed toward synthesizing hydrocarbons and oxygenated hydrocarbons from hydrogen and carbon monoxide. In this research the catalyst employed is powdered iron and the operations are being conducted in the laboratories and in the pilot plants for the most part employing the so-called fluid catalyst technique. By fluid catalyst technique one refers to an operation in which, say, powdered iron having a particle size of from 0 to 100 to 200 microns is suspended in the reactants in a reaction zone to form the dense, turbulent, ebullient mass of catalyst in gasiform material by causing the gases to flow upwardly at a low superficial velocity, say, from ½ to 1½ feet per second. The operations are usually carried out at temperatures of from 500 to 725° F. and at pressures up to 700 pounds per square inch with an $H_2$ to CO ratio of from 1 to 2 mols of $H_2$ per mol of CO comprising the main processing conditions. Depending, however, upon these operations and also on the amount of $CO_2$ in the feed to the reactor, the product obtained is never 100 per cent hydrocarbon but, as indicated, contains appreciable quantities of alcohols, ketones, and acids having one or more carbon atoms per molecule. These oxygenated hydrocarbons, particularly the lower boiling products which are found in the water formed in the reaction have high market value and may be recovered and purified to be sold as alcohols, ketones, aldehydes, etc. A considerable quantity, as much as 20 per cent, of the oil layer is higher oxygenated hydrocarbons formed in the process and it will be necessary to treat this oil layer to remove the oxygen and form valuable olefins.

In general, my process involves a catalytic treatment of the normally liquid hydrocarbons. I realize that prior to my present invention, others had subjected oxygenated hydrocarbons to a treatment with, say, bauxite and they had also separated the product into a plurality of fractions which were subjected to the catalytic treatment under different conditions. In my process I segregate a gasoline heart cut ($C_6$ to 350° F.) and treat it, insofar as I am aware, under special conditions not heretofore employed by others. For example, I subject the foregoing heart cut ($C_6$ to 350° F. cut) of the gasoline fraction to a severe catalytic treatment while the heavy naphtha gas oil cut (350° F. and above) is subjected to a milder catalytic treatment and the $C_2$ to $C_5$ olefins are polymerized, all separately, as will more fully appear hereinafter.

While the catalyst used in this invention for treating the gasoline and gas oil may be a pure form of alumina known as bauxite, a silica-alumina type of catalyst may also be used. The latter may contain from 10 to 25 weight per cent of alumina, the higher percentages being preferred. This catalyst gives a greater degree of isomerization of the olefins in the gasoline and higher A. S. T. M. or motor octane rating for the same loss in liquid yield than with the bauxite catalysts. Other treating catalysts as natural acid-treated bentonitic clays and synthetic cracking catalysts as the silica-magnesia gel catalytic cracking catalyst may be employed. As will be stated later, a preferred method is to use the silica-alumina catalyst for the gasoline treating and bauxite for gas oil treating. For treating the lighter synthetic fractions, the $C_3$, $C_4$, $C_5$, and some $C_6$ cuts, a solid phosphoric acid catalyst is used. While a fixed bed reactor system (one reactor on stream while the other is being regenerated) may be used in my process, any continuous treating unit such as the "fluid" reactor and regenerator system may also be used and is preferred.

In the accompanying drawing, I have depicted diagrammatically by means of a flow plan a preferred modification of my invention. Referring in detail to the drawing, a synthesis gas, that is to say, a gas containing $H_2$ and CO prepared according to some known method, as by oxidizing and/or "reforming" natural gas or methane and containing from one to two mols of $H_2$ per mol of CO, (together, perhaps with 5 to 10 volumes per cent of $CO_2$ and a similar amount of water or steam) enters the system through line 1 and then passes through a synthesis reactor 3 which, as previously indicated, may be a "fluid" catalyst reactor of the hindered settler type containing a fluidized mass of, say, powdered iron in the reactants. Temperatures of from 550° to 750° F.

and pressures up to 700 pounds per square inch are maintained in the reactor. The feed rate of synthesis gas is from 10 to 40 standard cubic feet of synthesis gas per pound of catalyst, and under the foregoing conditions, the desired conversion takes place and the product is withdrawn through line 4 and delivered to a recovery system where the product is subjected to condensation to form a two-layer condensate comprising an upper hydrocarbon layer and a lower aqueous layer. Uncondensed gases are usually recycled via a line 6 to line 1 according to known procedure, this gas stream containing $H_2$, CO, and possibly normally gaseous hydrocarbons. A portion of this gas may be rejected through line 6b. The aqueous layer containing water-soluble alcohols, ketones, acids, etc., may be withdrawn from recovery system 5 through a line 7 and subjected to purification according to known means not forming a part of this invention. The hydrocarbon layer, which is associated with oxygenated hydrocarbons not soluble in water is withdrawn from the recovery system through line 8 and subjected to fractional distillation in tower 10, where it is separated into a plurality of fractions, as follows:

(1) A light hydrocarbon fraction containing principally $C_4$ and $C_5$ hydrocarbons and some $C_3$ to $C_6$ hydrocarbons is withdrawn overhead through a line 11 and delivered to a polymerization step 12, wherein olefinic hydrocarbons are polymerized or co-polymerized to form polymer gasoline or naphtha which may be withdrawn through line 13. Uncondensed gases from this polymerization step are withdrawn from the polymerizer through a line 14. In addition to the conventional polymerization of the olefins to give a higher boiling product, the solid phosphoric acid treatment removes oxygenated hydrocarbons in this boiling range. Polymerization of substantial quantities of the $C_5$ fraction is desirable to give a gasoline of balanced volatility, less than 22 per cent boiling less than 150° F. in A. S. T. M. distillation.

(2) A heart cut of gasoline is taken off as a side stream from tower 10 through line 15 and subjected to catalytic treatment, this cut containing from $C_6$ to 350° F. end boiling point naphtha. The treatment takes place in step 16 and preferably the conditions are: temperature of 850 to 950° F.; pressure of 20 pounds per square inch gauge; feed rate of about 1 volume of oil (liquid basis) per volume of catalyst (e. g., bauxite) per hour during one-hour cycle; and the operation is improved by including with the oil from 5 to 25 per cent of its weight of steam. This catalytic treatment is usually carried out, as stated, for a period of an hour, whereupon the flow of oil is interrupted to permit regeneration of the catalyst by known means. The catalytic treated gasoline heart cut is withdrawn from the treating step 16 through line 17, debutanized in distillation tower 18 and then is delivered to storage 20 with the polymer gasoline in line 13. The normal gaseous material containing olefins is withdrawn through line 18a and delivered to the polymerization step in 12.

(3) The heavy naphtha and gas oil is withdrawn from tower 10 through line 21 and subjected to a mild catalytic treatment in vessel 30, as follows:

The catalytic (e. g. bauxite) treatment is carried out under milder conditions merely to improve the color and odor of the product rather than to remove all the oxygenated products. The temperature in treater 30 is from 800 to 975° F., with 900° F. preferred; the space velocity is from 1 to 5 volumes of oil per volume of catalyst per hour; the pressure is from 10 to 50 pounds per square inch gauge; and from 0 to 10 weight per cent steam (based on the oil) may be added. The treating time is longer than in the severe treatment of the naphtha in treater 16, being of the order of 2 to 10 hours on stream before changing from one reactor to another (not shown) for regeneration of the catalyst. The product is withdrawn from treating vessel 30 and separated by fractional distillation in tower 31 to give gasoline and lighter products boiling below the initial boiling point of the feed, say, about 350° F., and this fraction is fed by line 32 to fractionator 18, and gasoline formed in the treater 30 is eventually mixed with the blend in 20. A light gas oil fraction may be withdrawn from fractionator 31 through line 33. If desired, a bottoms fraction may be taken from tower 31 and recycled to unit 30 through lines 34 and 35 for further processing and reduction in boiling range. This recycling may be continued to give almost ultimate yield of gasoline but still at milder treating conditions than used in the light naphtha treat in step 16.

The heavy gas oil formed in the process is withdrawn from tower 10 through line 22, filtered in 23, and delivered to storage through line 24. It will be understood that, in spite of careful precautions, some of the powdered catalyst will pass through the catalyst recovery system and appear in the bottoms of the fractionating column 10. These are undesirable, of course, and should be filtered out. The said heavy gas oil may be subjected to catalytic cracking according to known procedure, or otherwise utilized.

Another modification of my process involves an operation wherein the light fraction (normally gaseous in 12) is treated with phosphoric acid to de-oxygenate any oxygenated hydrocarbons, followed by polymerization of the thus formed olefins to give the desired volatility in the final blend in receiver 20. The intermediate heart cut, which boils in the range of about $C_6$ to 350° F. fraction (true boiling point distillation), is severely treated with a silica-alumina gel catalyst (13 to 14 weight per cent $Al_2O_3$, the remainder $SiO_2$) and the light olefins which are formed either as a result of the synthesis reaction in 3 or as a result of the bauxite treating step in reactor 16 are polymerized in the presence of the phosphoric acid and added to the gasoline. The remaining fraction (heavy naphtha and gas oil) is mildly treated with bauxite as previously described in reactor 30 to give a good grade Diesel oil or heating oil. Any material formed which boils lighter than the feed in the last-mentioned step may be added to the gasoline cut.

Referring again to the product in line 21 or that in line 34, the same may be subjected to simple (non-destructive) hydrogenation in known procedure to produce a kerosene or Diesel fuel in a hydrogenation step 25 and the $H_2$ may be obtained from the gas in line 6 (after scrubbing it for $CO_2$ removal) via line 6a, which gas may contain as much as 50 per cent of $H_2$. The hydrogenated product is withdrawn from the hydrogenation step 25 by line 26 and delivered to storage (not shown).

To recapitulate briefly, the invention here resides in treating the heart cut of the gasoline under rather severe conditions in the presence of a solid catalyst such as bauxite or the silica-alumina cracking catalyst and separately treating the heavy naphtha and gas oil under milder conditions, or hydrogenating the latter. By treating the liquid products separately, as hereinbefore indicated, minimum quantities of coke and gas are formed while the gasoline formed is greatly improved in octane number to the extent that it will have a Research Octane number of 87 to 95 clear and A. S. T. M. octane of 75 to 82 clear. With respect to the heavy naphtha and gas oil withdrawn from tower 10 through line 21, the same is preferably first subjected to the solid catalyst treatment which may be a recycle operation and then subjected to hydrogenation to form a higher quality kerosene or Diesel fuel. The hydrogenation is carried out at temperatures of 300 to 600° F. in the presence of known hydrogenation catalysts such as nickel sulfide, tungsten sulfide, or a mixture of the two, under pressures of 350 to 750 pounds per square inch, the contact or residence time of the oil being merely such as to saturate the olefins without effecting any destructive hydrogenation. Also, as previously stated, the waste hydrogen, after removal of $CO_2$ in gas from the process may be used in the step.

Numerous modifications of my invention will appear to those familiar with this art.

What I claim is:

A process of improving the quality of the synthesis product produced by reacting together CO and $H_2$ under hydrocarbon synthesis conditions of temperature and elevated pressures and in the presence of a fluidized iron catalyst in a hydrocarbon synthesis zone to form a synthesis product containing normally liquid and gaseous hydrocarbons including olefins and oxygenated hydrocarbons which consists essentially in separating the crude product into a relatively low boiling gasoline fraction containing olefins, an intermediate gasoline fraction boiling in the range of $C_6$ hydrocarbons to about 350° F. and a heavy naphtha-gas oil fraction containing oxygenated hydrocarbons, treating the first named fraction with a polymerizing catalyst to cause polymerization of olefinic hydrocarbons, separately treating said intermediate fraction in the presence of bauxite and added steam at temperatures within the range of from about 850° to about 950° F. whereby said fraction is improved as to octane number, subjecting said bauxite catalyst to a regeneration process after about one hour contact time with the oil stream, contacting in a separate contacting zone said heavy naphtha-gas oil fraction with bauxite at temperatures of about 800° to 900° F. and pressures substantially atmospheric, subjecting said bauxite in said second contacting zone to a regeneration process after a contact time of from about 2 to 10 hours with the moving oil stream whereby the color and stability of said heavy naphtha-gas oil fraction is improved, passing said mildly bauxite treated heavy naphtha-gas oil product to a hydrogenation zone, passing tail gas from said hydrocarbon synthesis zone to said hydrogenation zone, subjecting said oil product to a non-destructive hydrogenation reaction, and recovering a superior Diesel and heating oil.

CHARLES E. HEMMINGER.

REFERENCES CITED

The following references are of record in the file of this patent:

UNITED STATES PATENTS

| Number | Name | Date |
| --- | --- | --- |
| 2,116,081 | Pier et al. | May 3, 1938 |
| 2,253,607 | Boyd et al. | Aug. 26, 1941 |
| 2,264,427 | Asbury | Dec. 2, 1941 |
| 2,301,246 | Brooks et al. | Nov. 10, 1942 |
| 2,347,682 | Gunness | May 2, 1944 |
| 2,398,674 | Schulze | Apr. 16, 1946 |
| 2,415,998 | Foster | Feb. 18, 1947 |
| 2,425,960 | Schulze | Aug. 19, 1947 |
| 2,436,962 | Gaucher | Mar. 2, 1948 |

FOREIGN PATENTS

| Number | Country | Date |
| --- | --- | --- |
| 823,262 | France | Jan. 18, 1938 |
| 850,756 | France | Dec. 26, 1939 |

OTHER REFERENCES

Underwood Ind. Eng. Chem., vol. 32, pages 449–554, Apr., 1940.